(12) United States Patent
Eilertsen

(10) Patent No.: US 11,263,908 B2
(45) Date of Patent: Mar. 1, 2022

(54) SERVICE PROVIDER SYSTEM ASSOCIATED WITH GEOGRAPHICAL POSITION BASED SERVICES AND A MOBILE SERVICE REQUESTING APPLICATION

(71) Applicant: Roger Andre Eilertsen, Askim (NO)

(72) Inventor: Roger Andre Eilertsen, Askim (NO)

( * ) Notice: Subject to any disclaimer, the term of this patent is extended or adjusted under 35 U.S.C. 154(b) by 0 days.

(21) Appl. No.: 17/254,137

(22) PCT Filed: Jun. 14, 2019

(86) PCT No.: PCT/NO2019/000018
§ 371 (c)(1),
(2) Date: Dec. 18, 2020

(87) PCT Pub. No.: WO2019/245376
PCT Pub. Date: Dec. 26, 2019

(65) Prior Publication Data
US 2021/0264791 A1    Aug. 26, 2021

(30) Foreign Application Priority Data

Jun. 18, 2018  (NO) .................................. 20180845
Aug. 23, 2018  (NO) .................................. 20181103

(51) Int. Cl.
*H04W 4/02* (2018.01)
*G08G 1/00* (2006.01)

(52) U.S. Cl.
CPC ............. *G08G 1/202* (2013.01); *H04W 4/02* (2013.01)

(58) Field of Classification Search
CPC ............ G08G 1/202; G08G 1/00; H04W 4/02

USPC ....................................................... 455/456.1
See application file for complete search history.

(56) References Cited

U.S. PATENT DOCUMENTS

| | | | |
|---|---|---|---|
| 2004/0093280 A1* | 5/2004 | Yamaguchi | G07B 13/04 705/26.1 |
| 2012/0041675 A1* | 2/2012 | Juliver | G06Q 30/0283 701/465 |
| 2014/0040079 A1 | 2/2014 | Smirin | |
| 2016/0027307 A1* | 1/2016 | Abhyanker | G06Q 50/01 701/117 |

(Continued)

FOREIGN PATENT DOCUMENTS

| EP | 3 293 684 A1 | 3/2018 |
|---|---|---|
| TW | 201 227 547 A | 7/2012 |

OTHER PUBLICATIONS

International Search Report, International Application No. PCT/NO2019/000018, dated Oct. 8, 2019.

*Primary Examiner* — Congvan Tran
(74) *Attorney, Agent, or Firm* — Morse, Barnes-Brown & Pendleton, P.C.; Sean D. Detweiler, Esq.

(57) ABSTRACT

A service system includes a service provider server-system in wireless communication over a network with at least one service requesting application, wherein the requesting application is executing in a smartphone. The requesting application includes a computer coded map. The requesting application is configured, on a request by a user of the application, to request a service by transmitting a map information layer including a visual symbol located on the geographical position (GPS) of the smartphone together with an indication of the requested service to the service provider server-system.

15 Claims, 2 Drawing Sheets

(56) References Cited

U.S. PATENT DOCUMENTS

| | | | | |
|---|---|---|---|---|
| 2016/0063475 A1* | 3/2016 | Yule | ............... | G01C 21/00 |
| | | | | 705/39 |
| 2017/0293950 A1* | 10/2017 | Rathod | ............. | G06Q 30/0639 |
| 2019/0342739 A1* | 11/2019 | Shah | ................. | G01C 21/3492 |
| 2021/0049725 A1* | 2/2021 | Heath | .................... | H04W 4/40 |

* cited by examiner

SERVICE PROVIDER SYSTEM ASSOCIATED WITH GEOGRAPHICAL POSITION BASED SERVICES AND A MOBILE SERVICE REQUESTING APPLICATION

RELATED APPLICATIONS

This application is a national stage filing under 35 U.S.C. 371 of International Application No. PCT/NO2019/000018, filed Jun. 14, 2019, which claims priority to Norway Application No. 20180845, filed Jun. 18, 2018 and Norway Application No. 20181103, filed Aug. 23, 2018. The entire teachings of said applications are incorporated by reference herein.

FIELD OF THE INVENTION

The present invention is related to a service provider system associated with geographical position located services and a mobile service requesting application, wherein a service server-system and the service requesting application communicate with each other by uploading and downloading service related information via computer coded map information layers over a network.

BACKGROUND OF THE INVENTION

Modern cars are changing their appearance from petrol driven speed monsters to electric and environmentally friendly computer driven machines. Many modern cars need software updates from time to time provided over the Internet instead of changing oil from time to time at workshops. In a sense, many modern cars are computers equipped with wheels and a motor. One major benefit of modern cars is the ability to communicate with them over the Internet.

Taxi services are providing a service correlated with a geographical pick-up point, usually a street address, and a delivery location, which is normally a street address as well. Several taxi apps exists in prior art and one of the more used ones is the system delivered by Uber. This is a one-click system comprising a client application program in respective user's mobile phones and a server-system run by the Uber service provider. When a user activates the application program in his mobile phone, by touching the screen on his phone, the GPS position of his location is sent together with the request of a taxi to the Uber server-system. The Uber server-system identifies an available taxi in close proximity to the transmitted GPS position of the user. The user receives a confirmation that a taxi is on its way to his destination together with a photo of the taxi driver. The server-system can also update a map in the phone of the user indicating respective geographical positions the taxi is moving along. A user being member of the Uber system has a user profile comprising details of a credit card the user can pay for the transport in the Uber system.

Sometimes it happens that a user wants to order a taxi on the countryside, for example just outside a city limit. Then there is no street address. If a user orders a taxi outside a theatre just after a performance has ended, others waiting for a taxi can "hijack" the taxi even without having ordered one.

Similar problems may exist with other forms of geographical position associated services. For example, parcel delivery systems may pick-up parcels at one location and delivers the parcels at another location. In prior art there are examples of smart drones delivering parcels this way.

In the case of the Uber system, it is easy to get a taxi to a specific location and the requester can follow the movement of an approaching taxi. As discussed above, taxis may be "hijacked" by other persons.

This may not be a big problem with taxis, but if one wants to be sure that a passenger is the one requesting the taxi, the taxi driver should receive some form of identification of the passenger. The passenger receives a photo of the driver, but normally the driver receives no confirmation about the passenger's identity. There are some examples in prior that taxi companies can generate a code the requester receives over the phone when ordering the taxi, which can be given to the driver as a confirmation of the taxi order.

When a person is ordering a taxi, it is also a question of security involved. One aspect is the identity of the taxi driver, but when a taxi drives a person to his home address and need to reveal his identity, for example when paying with a credit card in the taxi, or as a confirmation for his identity, this can pose a later security risk. Therefore, keeping anonymity of requesters of services is preferable.

When for example drones are shipping valuable items, it is mandatory that a recipient can confirm his identity. Otherwise, wrong people can get hold of valuable items. A company providing these kind of services needs expensive insurances to cover losses if they are responsible. Secure delivery includes delivery to the correct person or company. Further, a recipient should normally sign a receipt when receiving documents, especially legal documents, goods etc. When ordering a delivery, this can be to another geographical location not associated with the requester of the service. For example, a plumber working in a house misses a part and order a drone or a courier service to ship the missing part to the location of the work.

Therefore, it can be a tradeoff between keeping anonymity, and at the same time be able to reveal the identity of a service requester without compromising needed anonymity.

Therefore, there is a need of an improved service provider system associated with geographical position based services.

OBJECT OF THE INVENTION

It is a further object of the present invention to provide an alternative to the prior art.

In particular, it may be seen as an object of the present invention to provide a geographical position based system wherein information related to geographical positions and services is communicated between a requester and a service provider by exchanging map information layers of computer-coded maps.

SUMMARY OF THE INVENTION

Thus, the above described object and several other objects are intended to be obtained in a first aspect of the invention by providing a service system comprising a service provider server-system in wireless communication over a network with at least one service requesting application, wherein the requesting application is executing in a smart phone, wherein the requesting application comprises a computer coded map, wherein the requesting application is configured, on a request by a user of the application, to request a service by transmitting a map information layer comprising a visual symbol located on the geographical position (GPS) of the smart phone together with an indication of the requested service to the service provider server-system, wherein the request of a service further comprises a user selected radius around the requesting smart phone wherein the service provider server-system should search for the requested service, the service provider server-system contacts at least one service provider of the indicated requested service located within the requested radius, service providers respond to the request of service by sending a map information layer to the service provider server-system, wherein the submitted map information layer comprises a visual symbol on the geographical position of the service provider, the service provider server-system submits respective received map information layers to the requesting smart phone, wherein respective received map information layers are scaled to a same zoom level, a user of the smart phone selects the one of the at least one responding service provider by touching a visual symbol representing the geographical position of the at least one service provider, thereby a communication link between the user and the at least one service provider is established over the network.

Respective aspects of the present invention may each be combined with any of the other aspects. These and other aspects of the invention will be apparent from and elucidated with reference to the embodiments described hereinafter.

The service provider server-system according to the present invention will now be described in more detail with reference to the accompanying figures. The accompanying figures illustrates an example of embodiment of the present invention and is not to be construed as being limiting to other possible embodiments falling within the scope of the attached claim set.

DETAILED DESCRIPTION OF AN EMBODIMENT

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. The mentioning of references such as "a" or "an" etc. should not be construed as excluding a plurality. The use of reference signs in the claims with respect to elements indicated in the figures shall also not be construed as limiting the scope of the invention.

Furthermore, combining individual features mentioned in different claims may be advantageously, and the mentioning of these features in different claims does not exclude that a combination of features is not possible and advantageous.

Figure 1A:
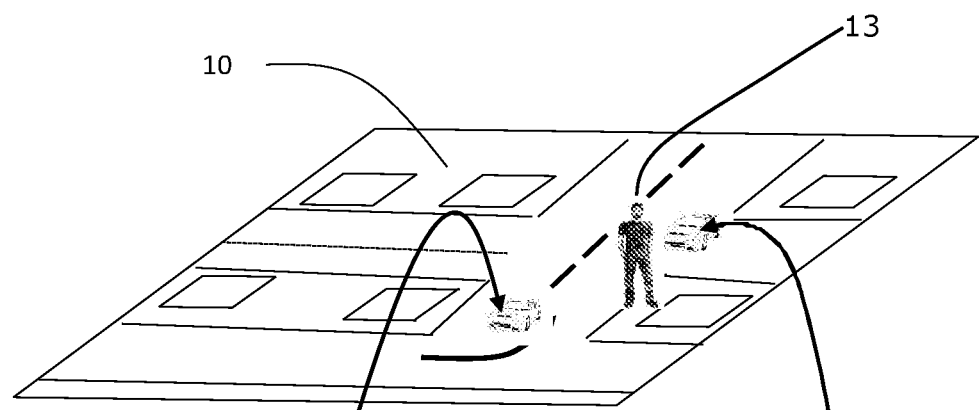
FIG. 1 illustrate an example of embodiment of the present invention.
Figure 1B:
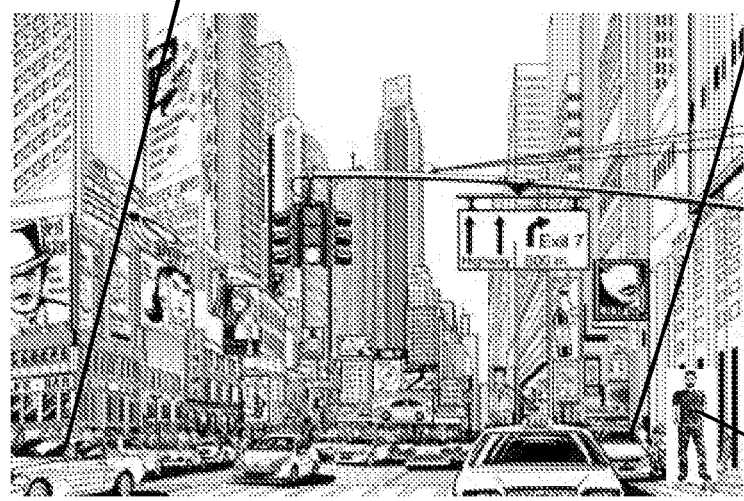

FIG. 1a illustrate the relationship between moving cars and positions in a map 10 in FIG. 1a and cars illustrated in a street view in FIG. 1b. Cars driving on a street can submit their GPS (Global Positioning System) positions to a computer system updating respective GPS positions in a computer coded version of the map 10 (refer FIG. 1a and FIG. 1b). Respective GPS positions 11, 12 can be submitted to a computer system according to different communication protocols as known in prior art. The readout of GPS positions can be done on a regular basis thereby car movements can be plotted and tracked and visualized by symbols on roads in a computer-coded version of the map 10 as known in prior art.

FIGS. 1a and 1b illustrate a person 13 standing on a side of a road trying to get the attention of a taxi. The physical position of the person illustrated in FIG. 1b can be visualized with a visual symbol in the map 10 on the same GPS position the person is actually standing in the real world.

Figure 2:
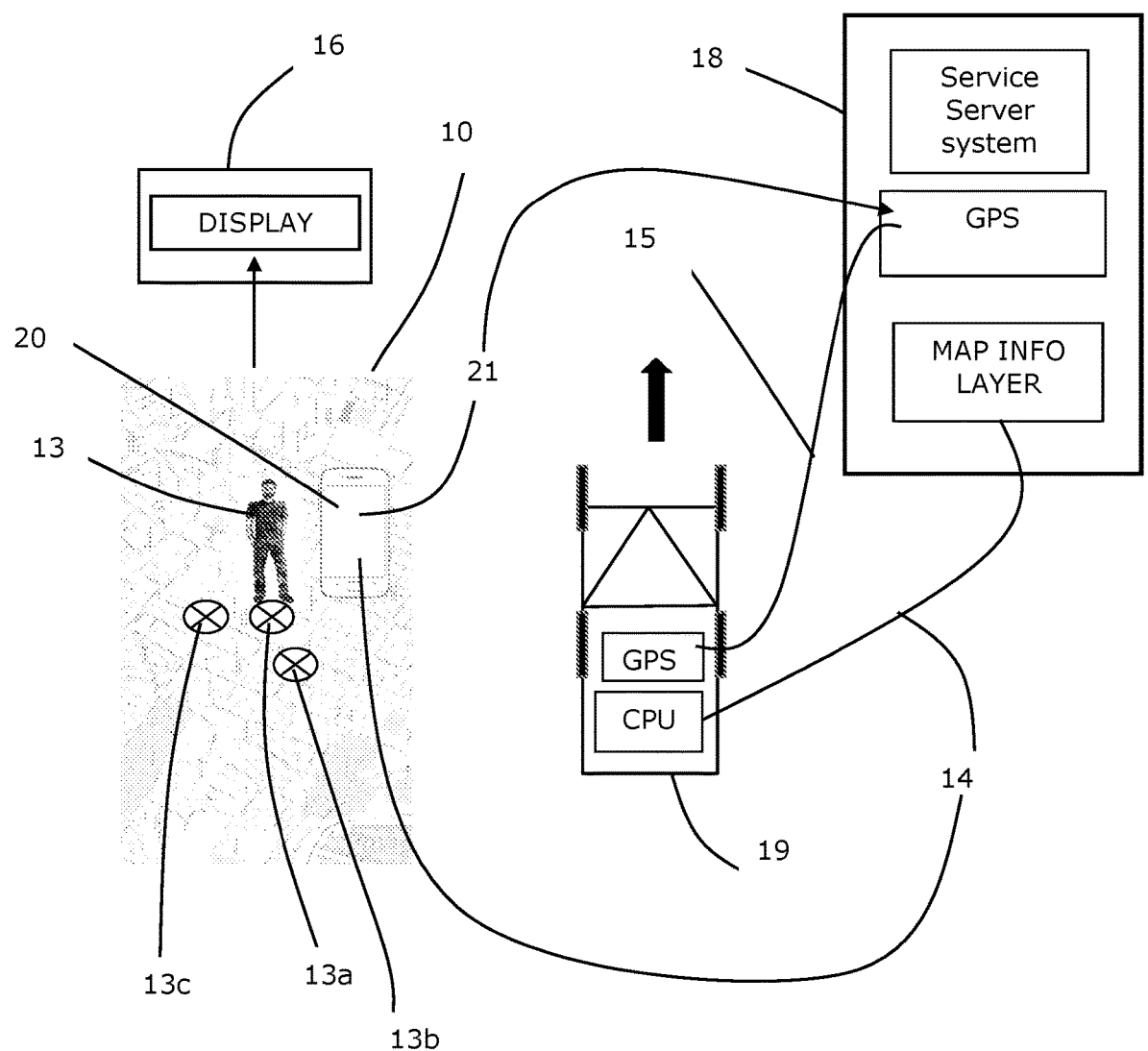
FIG. 2 illustrates further details of the example of embodiment illustrated in FIG. 1.

FIG. 2 illustrates a situation wherein the person 13 is carrying a mobile phone 20 with a GPS transceiver.

According to an aspect of the present invention a mobile phone 20 can be activated to transmit the GPS position 21 to a service server-system 18, for example a Taxi service server-system. A taxi service server-system can maintain positions of all taxies inside a geographical area as well as GPS positions of persons requesting a taxi, i.e. is requesting a taxi sending their GPS positions 21.

Couriers, drivers bicyclists etc. of a service providing company utilizing a service server-system according to the present invention are registered in the system through a strong identity verification process, which may include three dimensional face recognition.

On the other hand, users or requesters of services can be given a unique identity in the system that hides their true identity, i.e. real name and address etc. Mobile phone numbers are also registered providing a unique identification of the platforms respective users of a service server-system is using. In some situation it may also be necessary to have strong versification of a requesters identity, for example in cases involving transport of valuable items like jewellery.

A taxi driver, which is a service provider, is registering full identification including a photo in a taxi service server-system according to the present invention, which is available to requesters of taxis.

If the service of a service server-system according to the present invention is self-employed drivers of cars and/or cyclists which also are service providers, they are registered with full identification including a photo, which may include three dimensional face recognition. Strong verification of a courier is required at a pickup location, for example at a jewellery shop preventing a false courier access to the premises.

If drones is part of a service server-system according to the present invention, there is no need of having a strong verification of a drone itself except at a pick-up point wherein a false drone is sent, for example by a hacker that has infiltrated the service provider server-system. A solution is to have a visually visible printed identity tag on the body of the drone the recipient has receives a copy of and an use this to confirm the identity of the drone. However, it is required that the recipient can be identified as the correct recipient. There are several known methods available in prior art that can provide such an identification. For example, when a drone has reached a destination, the drone (or the service server-system) may send an SMS to a registered mobile phone of the recipient asking the recipient to enter a PIN code transmitted back by the recipient to the service server-system that then can instruct the drone to deliver the items to the recipient. The server may also correlate the GPS position of the mobile phone with the GPS position of the drone etc.

If the service server-system comprises computer systems acting as a requester of a service, block chain technology may protect all the examples of transactions that is possible according to the present invention. Block chain technology can also be used in parts of a system according to the present invention.

In prior art a taxi server-system is selecting an available taxi according to distance from the requester of a taxi. Normally the nearest taxi will also be the one that reaches the person 13 (FIG. 1 and FIG. 29 in shortest possible time. However, traffic jam, accidents, slow traffic in general can increase the time a taxi uses to reach the actual location to pick-up the requesting person 13 despite a short distance between them. As discussed above, a third person may "hijack" a taxi on its way to the requesting person. It may also be of interest to the requesting person not to identify the real location the person is requesting the taxi from etc.

According to an aspect of the present invention, a requesting person 13 can place a visual symbol, for example, a cross in a computer coded map (FIG. 2), for example residing in the person's mobile phone 20. The cross may be located in a street parallel to the street the person is actually located when requesting. It is also possible to locate the cross in the street outside a building the requesting person is located. The effect is that the user is in control of the location of the pickup point.

In such situations, the service server-system may be configured to ask the requester to verify the locations thereby avoiding an erroneous placement of a cross.

In FIG. 2 it is illustrated an example of embodiment of the present invention, wherein it is possible to place more than one cross 13a, 13b, 13c representing possible pickup points in nearby streets for example around a location the requesting person 13 is physically located. When the requesting person has placed at least one cross in a local map 10 in his mobile phone 20, a map information layer generated in the phone 20 comprising the GPS positions of the at least one pickup point 13a, 13b, 13c is transmitted to the service server-system 18.

The service server-system may also be configured to control that the distance between multiple pickup locations of a same requester is not too far away from each other. The system may be configured with a maximum allowed distance between the pickup points of a same requester 13.

A user identity assigned to the requester by the system is used to keep track of different requester's transactions in the system.

In FIG. 2, all taxis 19 located within a defined geographical area around the pickup point(s) is in communication with the service server-system 18. When the service server-system 18 receives the map information layer from the requester, a copy of the map layer information from the request 13 is sent to all taxis located within a certain limited distance from the pickup point(s).

The service server-system keeps track of all taxis by receiving GPS positions from the respective taxis. The taxis sees the possible new customer located in the map on his display in the car. The downloading of the map information layer can also be followed with a separate message informing about the download. A taxi driver can choose to touch a pickup point in the map thereby signalling via the service server-system that the specific taxi is driving towards the pickup point. The requester receiving this information can decline the offer if he wants. Instead, the requester receives a downloading of the map information layer that includes the GPS positions of taxis nearby the location of the pickup points. The requester can then select which one of the taxis he want to use by touching the visual symbol on the GPS position of the taxi on his mobile phone display. A dialog may start wherein the taxi driver (or the service server-system) transmit the identity and photo of the taxi driver. The requester accept the offer by pushing one of the multiple pickup points (or single point) he wants to use for this specific selected taxi. The taxi receives the information of the pickup point via the service server-system.

Thereby the requester is in control of which taxi to use based on geographical positions of taxis, and can take into account local traffic congestion problems at the time of requesting the taxi selecting a taxi that will avoid the congestion problems when driving to the requesters position.

According to an aspect of the present invention, a person may for example exchange map information layers, i.e. information layers comprising for example geographical positions of interest with other persons or companies.

For example, a person wants to order a pizza. A service requesting application in his phone may then be used to send a map layer information comprising his geographical position together with an order of a specific type of pizza, for example a margarita. A service server-system receiving the map layer information can then distribute the map layer information from the user to a select number of pizza shops located nearby the geographical position of the requesting person. The requesting person may not have any available information about pizza shops nearby his position, but the service server-system has. A pizza shop may see the request and can submit an information layer comprising the geographical position of the shop together with the price of the pizza. When receiving the information layer, the requesting person can confirm the order, and at the same time, the service requesting application in his phone provides the shortest route from his geographical position to the pizza shop.

Another approach to the pizza ordering is that the person requesting the pizza receives a map information layer comprising all pizza shops nearby his position together with prices of the pizza type he wants. The requesting person can select the cheapest pizza shop, for example by touching the visual symbol in the map located on the geographical position of the shop. The selected shop gets the order via the service server-system in communication with respective pizza shops.

It is also within the scope of the present invention that a requester can send a size of a radius around his graphical position within the service provider server-system should look for a service.

In addition, a map layer information comprising geographical positions of pizza shops, may comprise links to menus of respective pizza shops. Activating a menu of a pizza shop can be done when the requesting person touches the visual symbol in the map representing the pizza shop. Then the link is activated and the requesting person can view different choices and prices. This can be repeated with other pizza shops. When the requesting person touches a specific pizza in one of the menus, the order is effectuated as discusses above.

A further approach is that the person requesting the pizza can place an order of delivery of a pizza to his geographical position. The decision of receiving the pizza at his geographical position can be a choice the requester can make when confirming the order sent a selected pizza shop. For example, if the distance from his geographical position is short it can be convenient to walk to the shop. Otherwise, delivery by a courier, for example a drone is possible.

It is within the scope of the present invention that a service server-system according to the present invention comprises a plurality of different geographical position dependent services, wherein the service requesting application can select between respective services.

For example, in the example of a pizza delivery, the requesting person may activate a courier service implemented in the service server-system if the requesting person wants the pizza to be delivered by a courier.

It is further within the scope of the present invention that the service requesting application in mobile phones can automate requests of further services based on a first selected service. For example, if the pizza delivery as discussed above is chosen by the requesting person, the service requesting application can select the service automatically on behalf of the requesting person.

Within this perspective, the service server-system supporting pizza shops need not support another service like a courier service. The courier service may be located and operated by any other service provider.

An aspect of the present invention is that the service requesting application in respective user's mobile phones can be configured to interact with any service provider communicating services and offers via map information layers. The actual content of the service is embedded in the visual symbols of services submitted in information layers form respective service providers. It is further within the scope of the present invention that multiple information layers from multiple service providers can be downloaded to respective users mobile phones.

It is further within the scope of the present invention that a requester customize his service requesting application to search for specific services when moving around.

For example, service providers can advertise their map information layer exchanging based services by having a web page with a name composed of for example "map-layer-service-pizza-name-of-shop". Another service could be taxi etc. The requester may then configure the service requesting application to search for web pages starting with the name "map-layer-service". Each respective "map-layer-service" page may comprise a geographical position a searching service requesting application can use to limit the reporting to the user of services just being located within a limited range or distance from the geographical position the user is located on at any time. Thereby a user of the system can limit the amount of information transferred to his phone.

There are multiple cars running on roads as well as motor bices and cyclists that only transport them self. This is a resource that should be utilized when transporting for example parcels, letters and smaller cargo of any type. It is an analogy to the Uber solution in prior art wherein private owned cars is used as taxis.

The Uber solution require that the private car is taken out of its normal use, i.e. being a private car. According to an aspect of the present invention, if a private car is driven from point A to point B, the driver could earn some extra money if for example a letter that anyhow should be sent from point A to point B is handed t the driver.

Therefore, if a service server-system according to the present invention is told by respective drivers where they are going when they start driving, persons or companies searching for transport can then be connected with a car driving between a point close to the pickup point and which is heading towards the desired destination for the transport.

However, there might be a route between a pick-up point A and a delivery point B outside the range of most drivers wanting to transport parcels etc. Therefore, the solution is to provide multipoint transport.

When transporting for example a letter between a pickup point A to a delivery point B it may be a situation wherein that a first driver is driving along a part of the rout towards the destination point B. If the first driver delivers the letter at a temporary delivery point B1, a second driver planning to drive from B1 to B can pick-up the letter and deliver the letter to B. It is important to understand that a temporary delivery point can be a railway station, a bus terminal, an ordinary post office, or selected shops, gas stations etc. If the temporary destination is a bus terminal, a bus can bring the letter forward to the destination. This may also be the case with the railway or the ordinary post system.

Therefore, temporary destinations should be allocated along roads, i.e. at least along all main roads in an area. It is also possible to allocate temporary delivery boxes located along road sides.

Security is an issue. The identity of the driver given a transport job should be confirmed. Any temporary delivery points should be secure so that parcels, letter etc. can be kept safe until further transport starts. The identity of receivers should also be verified.

Drivers wanting to earn extra money this way will be members (users) of a service provider server-system according to the present invention. The system register a mobile phone of the driver, which is for example verified by a telephone operator to be a phone owned by the driver. Further, three dimensional face recognition may also be part of the system. Pre-recorded video of respective drivers can serve the purpose of strong verification of drivers when needed or requested for example by customers of the service.

If a temporary destination is manned, the person receiving the parcel or letter etc. can be authenticated for example by sending a PIN code to a mobile phone registered in the system as belonging to this person.

If the temporary destination is a box along a road side, the opening or closing of a box is controlled by the service provider server-system. For example, when a driver reaches a temporary destination given to him by the system, the system detects that the car is close to the box. The system can then send a command to the box opening the door. It might be several boxes, and the system can then open one door of a box that is empty. The procedure may also comprise a step of three dimensional face recognition of the driver before opening a door.

When a second driver is coming to pick-up the parcel or letter etc., the door opens to the box comprising the item the second driver is supposed to transport further.

It is also possible to enhance the security at any temporary destination by installing web cams inside boxes, or at any other location wherein items being transported is temporarily stored. For example, when a box is opened when putting an item inside the box, a video stream will verify that the item actually is placed inside the box by the deriver.

At a final destination the identity of the recipient can be verifies by sending a PIN code to a phone registered to the recipient. The phone number can be entered by the recipient when ordering the transport.

The service requesting application of a driver may be configured to receive a request from the driver asking for a transport job. The application is then configured to ask for a name or any other type of identification of the destination of the planned driving. A map information layer is submitted to the service provider server-system.

The service provider server-system receives further request from drivers wanting to transport items. The service provider server-system adds all information layers received from drivers on top of each other, with for example different colour codes, thereby all possible transport routs available at any time is available in the service provider server-system.

When a driver is asking for a transport job, the time of the request is also recorded. The service provider server-system is configured to estimate the driving time to the destination of the driver. The server is then moving the start point of possible transports of respective drivers (for example tracking GPS positions) along their selected route, and when the driver reaches his destination, the associated map information layer is removed from the server.

When a customer orders a transport from a pick-up point A to a destination B, this can be done via a special application program providing a map wherein the customer can mark the geographical positions of the pickup point and the destination point. A map information layer is submitted to the service provider's server-system along with the order for the transport. When received, the service provider server-system is configured to add the received map information layer on top of all the submitted and updated map information layers submitted by drivers. The service provider server-system is configured to identify the one or more drivers that at present is on routes overlapping a route, or is driving in an approximate same direction, between the customer's requested pick-up point A and destination B.

An alternative to having a special application program at customers locations, a customer can give an order by issuing a street address for the pick-up point and the destination point. The service provider server-system can be configured to convert this information to a map information layer with marked GPS positions of the respective street addresses.

A respective driver that is identified to be able to provide the transport is identified by an identity associated with the map information layer submitted by him.

The service provider server-system is also configured to put an information layer on top of all the other information layers comprising markings of temporary destinations as discussed above. Thereby an optimal combination of drivers, their chosen routes, temporary destinations as well as destinations of an ordered transport route by a customer can be identified.

The selection process of a car as a candidate for a pick-up is a dynamic selection process. A car is moving and the selection of the car is therefore based on selecting a car that will arrive at pickup point or temporary destination to pick-up items for further transport within a defined time window.

When considering a car, the system can estimate the arrival time of the car at any destination point or temporary destination. A time window is allocated around each point enabling the system to be sure that a car can arrive at a predetermined time for a pick-up or not. For example, a delivery at a temporary destination should happen before a next car is arriving for the further transport. Thereby the system is also capable of providing an estimate for the delivery time at the final destination.

Computer coded maps residing in computer system or mobile phones can be zoomed in and out as known in prior art. When adding respective map information layers on top of each other, all the maps should be scaled equally, i.e. is zoomed to the same scale. The service provider server-system is configured to scale all received map information layers to the same zoom level.

A communication link over the network is possible to establish between a service provider and a requesting user using the service requesting application running un on a smart phone associated with the requesting service. For example, the visual symbol in the map layer information layer submitted from the requesting application to the service provider server-system may comprise the telephone number of the smart phone.

When the service provider server-system is receiving a response from a service provider, the map information layer comprising a visual symbol on the geographical location of the service provider, the telephone number of the service provider can be embedded in the visual symbol.

The visual symbol of the service provider can alternatively comprise an address to a home page of the service provider.

The visual symbols associated with the service requester and service provider can also comprise respective e-mail addresses etc.

In this and similar manners it is possible to submit contact information between a requester of service and a service provider.

The invention claimed is:

1. A service system, comprising:
a service provider server-system in wireless communication over a network with at least one service requesting application, wherein the requesting application is executing in a smart phone, wherein the requesting application comprises a computer coded map;
wherein the requesting application is configured, on a request by a user of the application, to request a service by transmitting a map information layer comprising a visual symbol located on the geographical position (GPS) of the smart phone together with an indication of the requested service to the service provider server-system;
wherein the request of a service further comprises a user selected radius around the requesting smart phone, wherein the service provider server-system searches for the requested service,
the service provider server-system contacts at least one service provider of the indicated requested service located within the requested radius,
service providers respond to the request of service by sending a map information layer to the service provider server-system, wherein the submitted map information layer comprises a visual symbol on the geographical position of the service provider,
the service provider server-system submits respective received map information layers to the requesting smart phone, wherein respective received map information layers are scaled to a same zoom level, and
a user of the smart phone selects the one of the at least one responding service provider by touching a symbol representing the geographical position of the at least one service provider, thereby a communication link between the user and the at least one service provider is established over the network.

2. The system of claim 1, wherein the at least one service provider is delivering the service at the geographical location of the requesting smart phone.

3. The system of claim 2, wherein a user may select alternative geographical deliverance locations of respective services.

4. The system of claim 3, wherein a user receives a map information layer comprising updated geographical positions of an approaching deliverance of service towards the alternative geographical deliverance location of the requested service.

5. The system of claim 1, wherein the service is a taxi service.

6. The system of claim 1, wherein the service is a courier system.

7. The system of claim 6, wherein the requesting application request transport of an item from a pick-up point to a destination point.

8. The system of claim 7, wherein the transport of an item between the pick-up point to the destination point is shared between multiple couriers.

9. The system of claim 8, wherein temporary destinations between the pick-up point and the destination is allocated by the service provider server-system, wherein respective couriers can pick-up the item being transported and deliver the item to a next temporary destination for pick-up by a further courier.

10. The system of claim 1, wherein the service provider server-system stack map information layers submitted from requesting smart phones and responding service providers on top of each other, thereby being able to analyze and identify possible service dependent transport routes and type of transport means between the location of the smart phone and a selected service provider, and other relevant issues related to the requested service.

11. The system of claim 1, wherein the service provider server-system is configured to request a user authentication procedure when a user is requesting a service via the smart phone requesting application.

12. The system of claim 1, wherein the service provider server-system is configured to request a user authentication of a courier when picking up a delivery to a requester of service.

13. The system of claim 1, wherein the service provider server-system is configured to request a user authentication of a courier when delivering a delivery to a requester of service.

14. The system of claim 1, wherein a default radius of the radius within which the service provider server-system is searching is defined by the geographical distance from the user of the service requesting application to a location of a first service provider of the requested service identified by the service provider server-system.

15. The system of claim 1, wherein contact information is embedded into the visual symbols on respective map information layers representing respective geographical positions of requester of services and service providers.

\* \* \* \* \*